United States Patent
Okada et al.

[11] Patent Number: 5,826,440
[45] Date of Patent: Oct. 27, 1998

[54] CONSTRUCTION MACHINE

[75] Inventors: Makoto Okada; Hideaki Aoki; Tokuo Fujii, all of Hiroshima, Japan

[73] Assignee: Kabushiki Kaisha Kobe Seiko Sho, Kobe, Japan

[21] Appl. No.: 862,923

[22] Filed: May 27, 1997

[30]  Foreign Application Priority Data

May 30, 1996 [JP]  Japan ..................................... 8-160701
May 30, 1996 [JP]  Japan ..................................... 8-160703

[51] Int. Cl.⁶ ....................................................... B60H 1/32
[52] U.S. Cl. ........................ 62/239; 62/DIG. 16; 62/285; 296/190
[58] Field of Search .............................. 62/244, DIG. 16, 62/239, 285; 296/190

[56]  References Cited

U.S. PATENT DOCUMENTS

| | | | |
|---|---|---|---|
| 3,555,846 | 1/1971 | Harbeck et al. | 62/244 |
| 4,098,093 | 7/1978 | Czyl | 62/244 |
| 4,201,064 | 5/1980 | Krug et al. | 62/244 |
| 4,608,834 | 9/1986 | Rummel | 62/DIG. 16 |
| 4,732,011 | 3/1988 | Haiya | 62/DIG. 16 |
| 4,982,583 | 1/1991 | Matsuda et al. | 62/DIG. 16 |
| 5,184,474 | 2/1993 | Ferdows | 62/DIG. 16 |
| 5,362,118 | 11/1994 | Houriez | 296/190 |

FOREIGN PATENT DOCUMENTS

| | | |
|---|---|---|
| 63-195016 | 8/1988 | Japan . |
| 3-47287 | 5/1991 | Japan . |
| 5-74919 | 10/1993 | Japan . |
| 6-106962 | 4/1994 | Japan . |
| 6-106963 | 4/1994 | Japan . |

*Primary Examiner*—William E. Tapolcai
*Attorney, Agent, or Firm*—Oblon, Spivak, McClelland, Maier & Neustadt, P.C.

[57]  ABSTRACT

In an air conditioner for conditioning the air present within a cabin, a cooler unit and a condenser for liquefying a gaseous refrigerant by forced cooling are arranged integrally on the upper surface of the cabin ceiling. The outer periphery of the cooler unit and that of the condenser are covered with a cover. Further, for the discharge of drain from the cooler unit, drain pipes are disposed on both front and rear sides of the cabin. The space in the narrow cabin can be fully utilized effectively.

22 Claims, 20 Drawing Sheets

F I G. 16
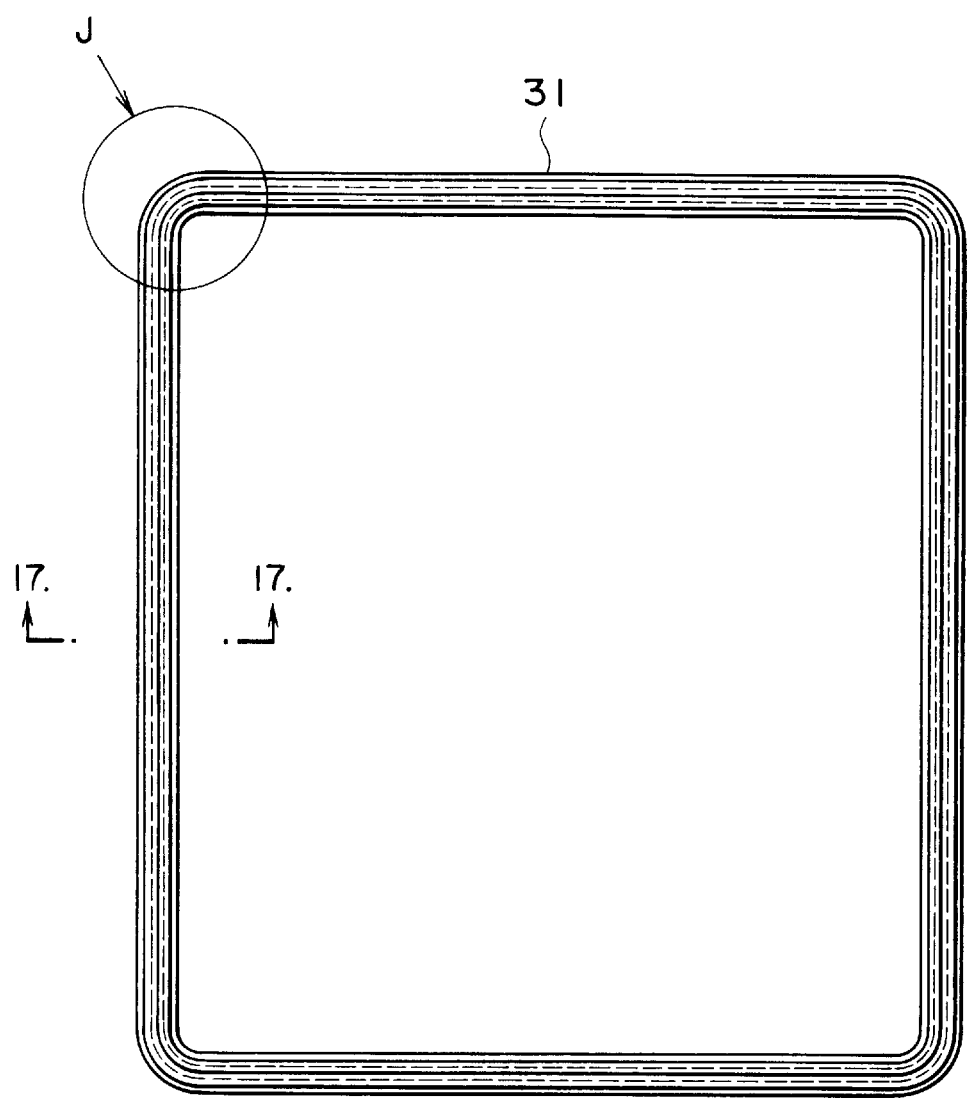

F I G. 17
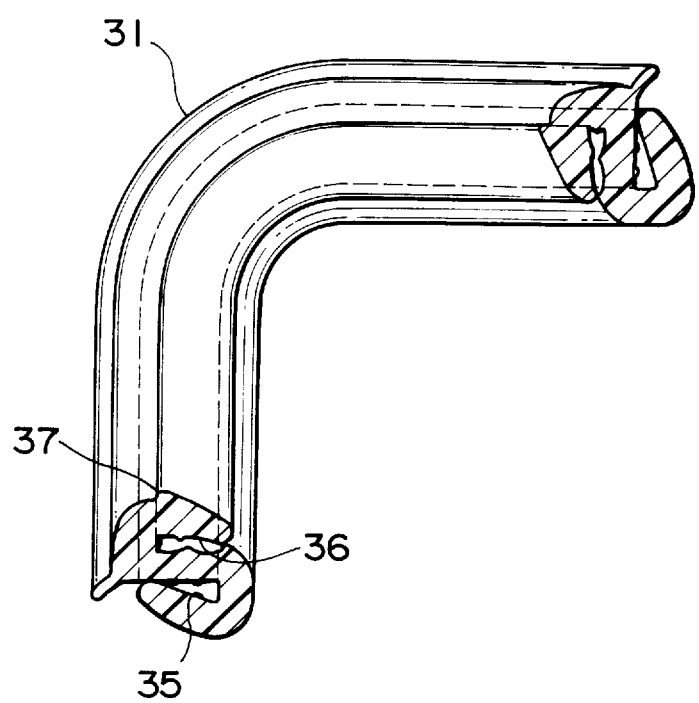

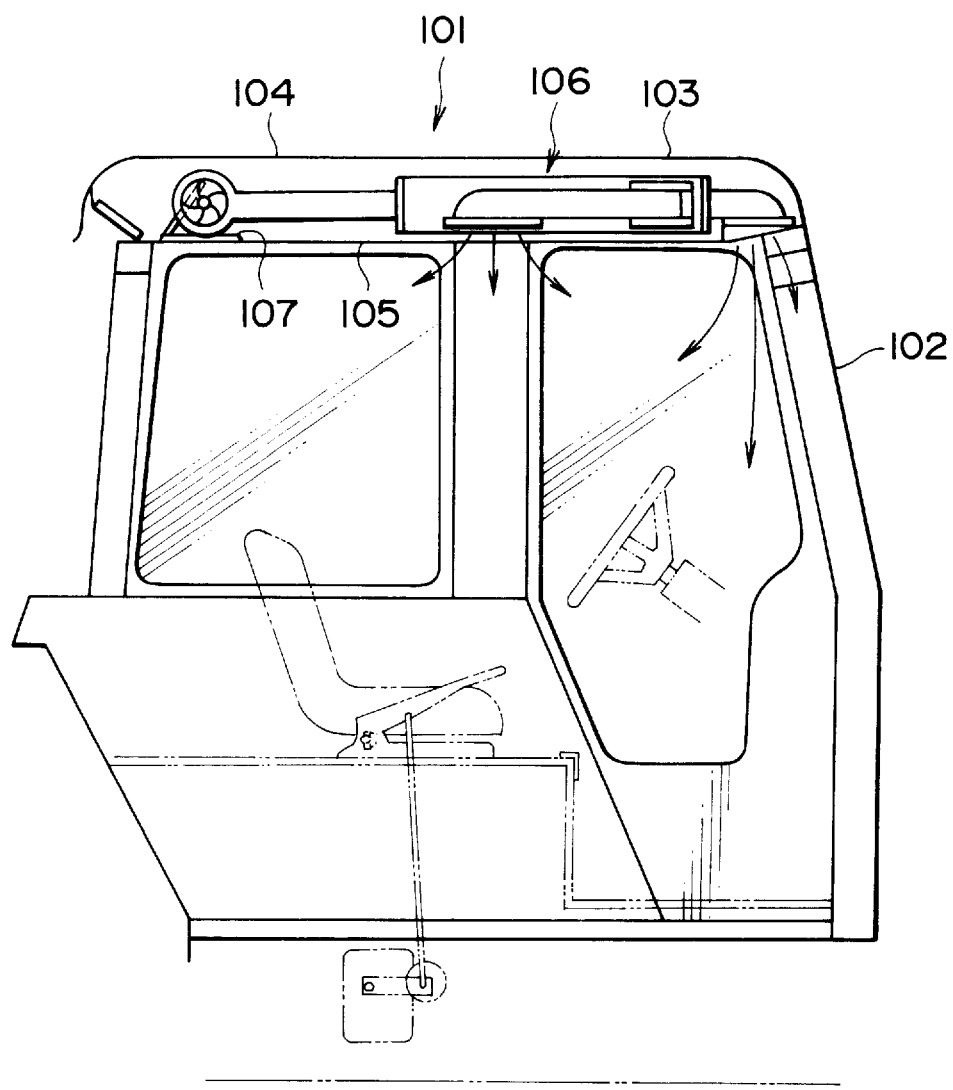

CONSTRUCTION MACHINE

BACKGROUND OF THE INVENTION

1. Field of the Invention

The present invention relates to a construction machine such as a hydraulic excavator and more particularly to an air conditioner mounted on a cabin of the construction machine.

2. Description of the Related Art

FIG. 20 illustrates the prior art described in Japanese Utility Model Laid Open No. 74919/93. In the same figure, the reference numeral 101 denotes a cabin. A roof 103 is formed on top of a frame 102 of the cabin 101. The roof 103 comprises an upper, outer roof 104 and a lower, inner roof 105. The outer roof 104 and the inner roof 105 are fixed together through a seal member, with a space being formed therebetween. An air conditioner 106 is disposed in the said space. The reference numeral 107 denotes a damper for change-over between the inside air and the outside air. The damper 107 is opened and closed automatically by means of a servo motor. Air conditioning in the interior of the cabin 101 is controlled automatically.

Generally speaking, in construction machines such as hydraulic excavators, it is optional whether the air conditioner 106 is to be mounted or not. In the conventional cabin shown in FIG. 20, if the air conditioner 106 is not mounted, the space between the outer roof 104 and the inner roof 105 comes to nothing; besides, the overall height, as well as the manufacturing cost, of the cabin become higher. In some construction machine of this type, the front window is sprung up pivotally above the operator's seat and toward the underside of the roof (manually or electrically) to open the front side of the cabin. However, the front window when sprung up as above obstructs the passage of air blown off from a blow-off port or duct.

As a technique for sealing the air conditioner with the cabin there is known such a technique as described in Japanese Utility Model Laid Open No. 47287/91.

SUMMARY OF THE INVENTION

It is an object of the present invention to provide a construction machine capable of utilizing the narrow interior space of a cabin effectively to a satisfactory extent.

It is another object of the present invention to provide a construction machine capable of carrying out an effective and healthy air conditioning through a head-cold foot-hot action.

It is a further object of the present invention to provide a construction machine having a nice appearance integral with a cabin.

It is a still further object of the present invention to provide a construction machine which permits easy mounting of an air conditioner.

It is a still further object of the present invention to provide a construction machine capable of preventing the entry of rain water into a cabin from a cooler unit mounted portion of the cabin.

In the construction machine of the present invention, a cooler unit of an air conditioner for conditioning the air present in the interior of a cabin and a condenser for liquefying a gaseous refrigerant by forced cooling are disposed integrally on the upper surface of the cabin ceiling.

In the construction machine of the present invention, it is preferable that the cooler unit is disposed on rear side of a skylight formed in the front portion of the ceiling and so as to be received within the range of the cabin ceiling. In this case, it is also preferable that a window hole for opening a conditioned air blow-off port of the cooler unit into the interior of the cabin be formed in a ceiling position which faces the said conditioned air blow-off port. Preferably, the outer periphery of the cooler unit and that of the condenser are covered with a cover. More preferably, with no air conditioner provided, a cover plate capable of closing the said window hole is mounted removably.

Preferably, in order to discharge the drain from the cooler unit, drain pipes are laid on both front and rear sides of the cabin. More preferably, part of the drain pipe laid on the front side is used as a pipe-like hand rail for the operator to grasp it at the time of getting on and off the construction machine. It is also preferable that the drain pipe located on the rear side be extended vertically along the outer peripheral surface of the rear side of the cabin. Still more preferably, a vertical recess is formed in the outer peripheral surface of the rear portion of the cabin, the rear drain pipe is laid in that recess, and the recess with the drain pipe therein is covered.

With such drain pipes laid on both front and rear sides, when the body of the construction machine tilts forward or leftward during operation of the machine, the drain is discharged through the front pipe, while when the machine body tilts backward or rightward, the drain is discharged through the rear pipe. Thus, the discharge of the drain is performed smoothly. Using part of the front pipe as a hand rail is advantageous in that the piping cost can be reduced to some extent and a nice appearance can be retained. Further, if a drain pipe is laid in the recess formed in the rear-side outer peripheral surface of the cabin and a cover is applied to the recess with the pipe therein, it is possible to not only prevent collision of the pipe with an exterior obstacle but also retain the nice appearance.

Preferably, the front window of the cabin is stowed to the lower surface side of the ceiling in an open condition of the front window. The front window may be formed removably to open the passage of air blown off from the conditioned air blow-off port in the cooler unit. The glass plate of the front window may be constituted by a plurality of glass plates capable of moving within the frame of the front window, and those glass plates may be opened. Alternatively, at least a part of the glass plate of the front window may be formed removably. Moreover, in a position other than the stowed position of the front window there may be formed another conditioned air blow-off port communicating with the above conditioned air blow-off port. By so doing, even with the front window of the cabin opened, the blown-off air can be directed to the operator without any trouble.

Preferably, a window hole is formed in the outer peripheral surface of the cabin ceiling, and an air conditioner is mounted in the window hole in a removable manner, with a trim member for sealing being fitted in the window hole throughout the whole circumference of the inner peripheral edge of the hole. More preferably, in the case where the air conditioner is mounted, a bottom cover plate of the air conditioner comes into watertight abutment with the outer peripheral surface of the trim member, while if the air conditioner is not mounted, a cover plate for closing the window hole comes into watertight abutment with the outer peripheral surface of the trim member. A groove may be formed in the upper portion on the inner peripheral side of the trim member so that the foregoing cover plate is fitted in the said groove removably. On the outer peripheral side of the trim member a projecting edge portion may be formed on the whole circumference of the upper end so that the said edge portion is brought into pressure contact with the bottom cover plate. Further, a frame-shaped sealing member formed of a synthetic resin having elasticity may be fixed to the underside of the bottom cover plate so that it comes into abutment with the whole circumference of the upper surface portion of the trim member.

According to this construction, it is possible to prevent the entry of rain water into the cabin from the cooler unit mounted portion on the cabin ceiling. Moreover, with a single trim member, it is possible to positively seal the cooler unit mounted portion or the fitting portion of the cover plate which is for closing the window hole. Thus, the sealing member can be used in common to both the case where the cooler unit for the air conditioner is mounted and the case where the cover plate for closing the window hole is mounted. This is economical because it is not necessary to increase the number of components of the sealing member. Further, on the outer periphery side of the trim member, the projecting edge portion formed on the whole circumference of the upper end portion comes into pressure contact with the frame-shaped sealing member fixed to the underside of the bottom cover plate of the cooler unit, it is possible to ensure sealing between both above members having elasticity.

BRIEF DESCRIPTION OF THE DRAWINGS

FIG. 16 is a plan view of a trim member as seen from H in FIG. 15;

FIG. 17 is an enlarged view of portion J in FIG. 16;

FIG. 20 is a side view of a conventional cabin.

DESCRIPTION OF THE PREFERRED EMBODIMENTS

The preferred embodiments of the present invention will be described in detail hereinunder with reference to the accompanying drawings.

Figure 1:
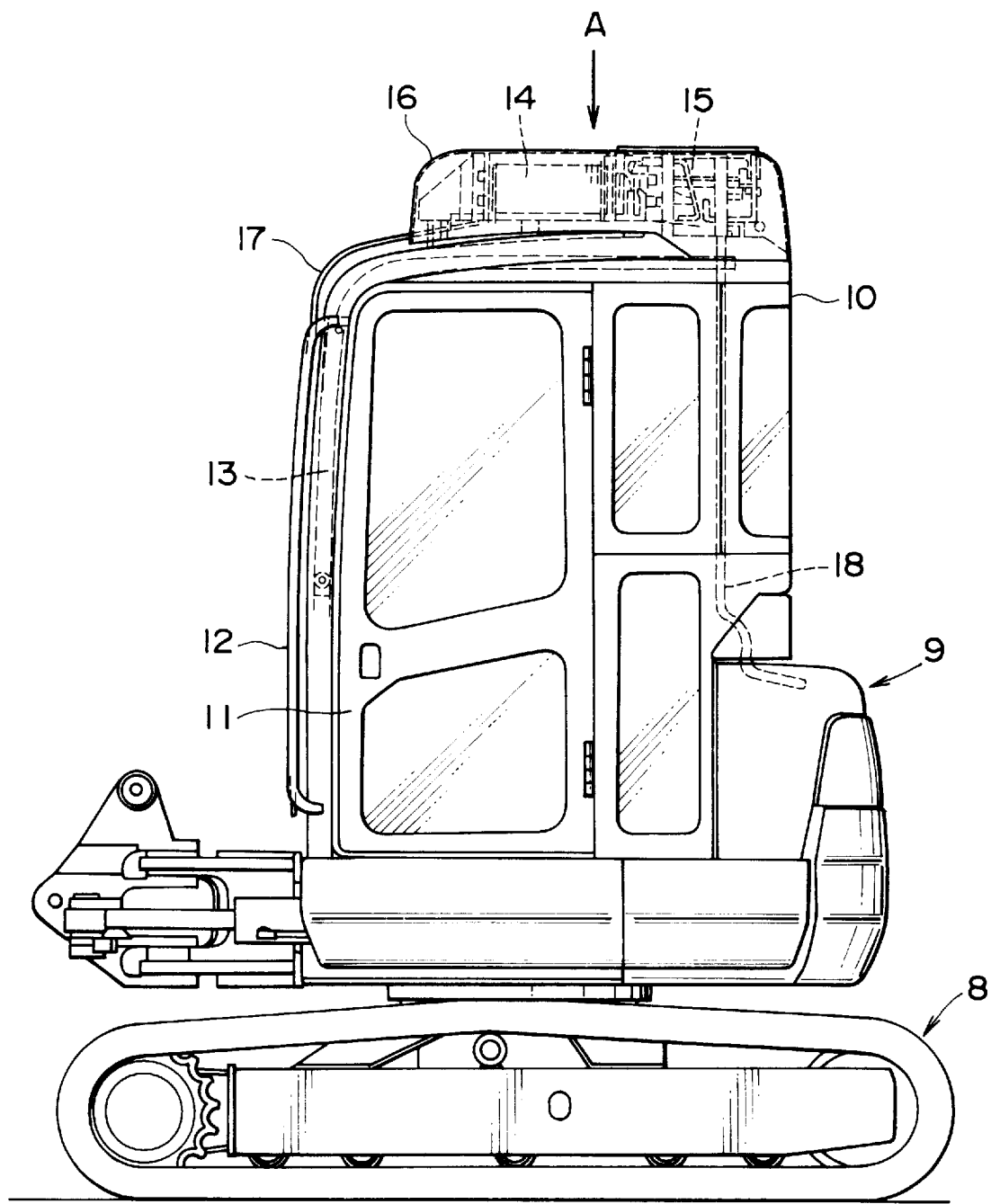
FIG. 1 is a side view of a construction machine embodying the present invention.

FIG. 1 is a side view of a construction machine embodying the present invention (a small-sized hydraulic excavator in this embodiment). In the same figure, the numeral 8 denotes a lower carriage of a small-sized hydraulic excavator. Numeral 9 denotes an upper rotating structure mounted swingably on the lower carriage 8. Numeral 10 denotes a cabin provided in the upper rotating structure 9. Numeral 11 denotes a door which is hinged for opening and closing to an entrance for getting on and off the cabin 10. Numeral 12 denotes a hand rail formed by a pipe (say a steel pipe) for providing assistance in getting on and off the cabin. Numeral 13 denotes a front window formed in the front portion of the cabin 10 so that it can be opened and closed. Numeral 14 denotes a cooler unit, numeral 15 denotes a condenser, and numeral 16 denotes a cover which covers the outer peripheral side ranging from the cooler unit 14 up to the condenser 15. Numeral 17 denotes a front drain pipe for the flow and discharge of drain from the cooler unit 14, and numeral 18 denotes a rear drain pipe.

Figure 2:
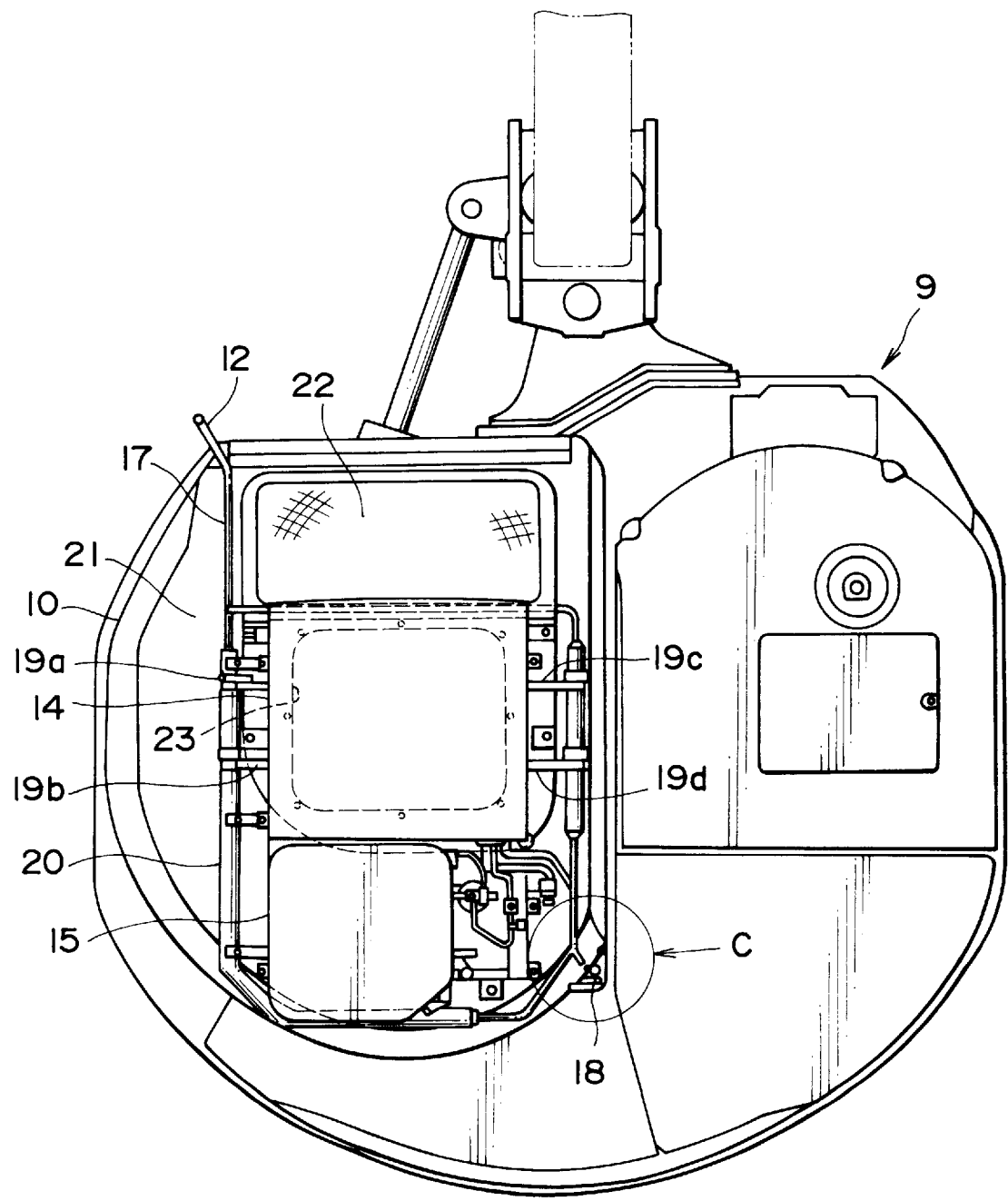
FIG. 2 is a plan view of an upper carriage as seen from A in FIG. 1.

FIG. 2 is a plan view of the upper rotating structure 9 as seen from A in FIG. 1, with the cover 16 removed. In FIG. 2, the numerals 19a, 19b, 19c and 19d denote drain outlet ports formed in four directions in FIG. 2. Numeral 20 denotes a communication pipe for communication of the drain outlet ports 19a~19d. Numeral 21 denotes a ceiling mounted at the upper portion of the cabin 10. Numeral 22 denotes a skylight provided in the front portion of the ceiling 21. Through the skylight 22 the operator sees obliquely upward on the front side. Numeral 23 denotes a window hole formed in the ceiling 21.

Figure 3:
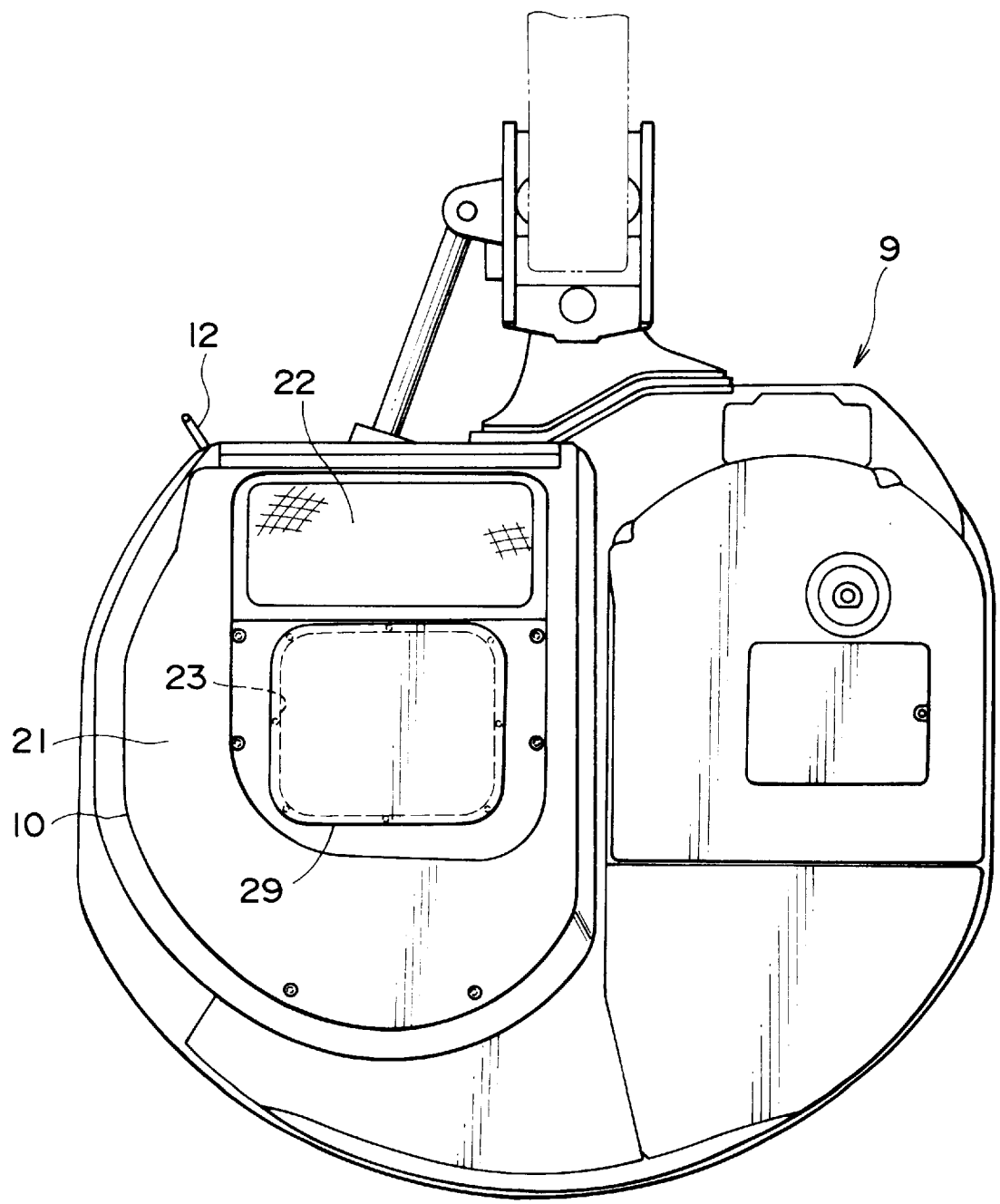
FIG. 3 is a plan view of the upper carriage not equipped with an air conditioner.

FIG. 3 is a plan view of the upper rotating structure 9 not equipped with an air conditioner. In the same figure, numeral 29 denotes a cover plate for covering the window hole 23.

Figure 4:
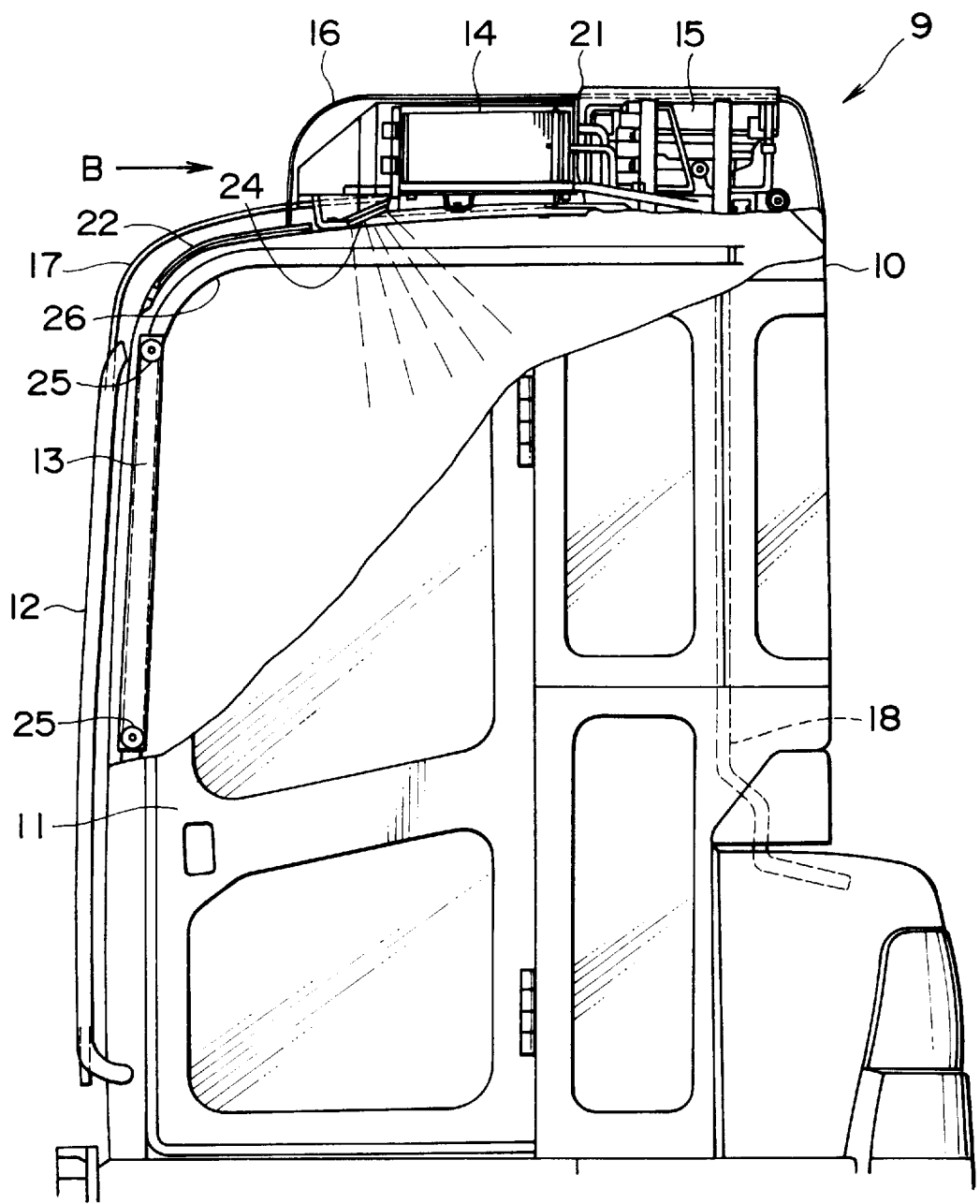
FIG. 4 is a partially cut-away side view of the upper carriage shown in FIG. 1.

FIG. 4 is a partially cut-away side view of the upper rotating structure 9 shown in FIG. 1. In FIG. 4, the numeral 24 denotes an air blow-off port in the cooler unit 14. Numeral 25 denotes a roller, which is disposed on both right and left sides of the upper and lower portions of the front window 13. Numeral 26 denotes a guide rail, which is disposed on both right and left inner wall surfaces of the cabin 10. The guide rails 26 guide the movement of the rollers 25 to spring up the front window 13 to the underside of the ceiling 21.

Figure 5:
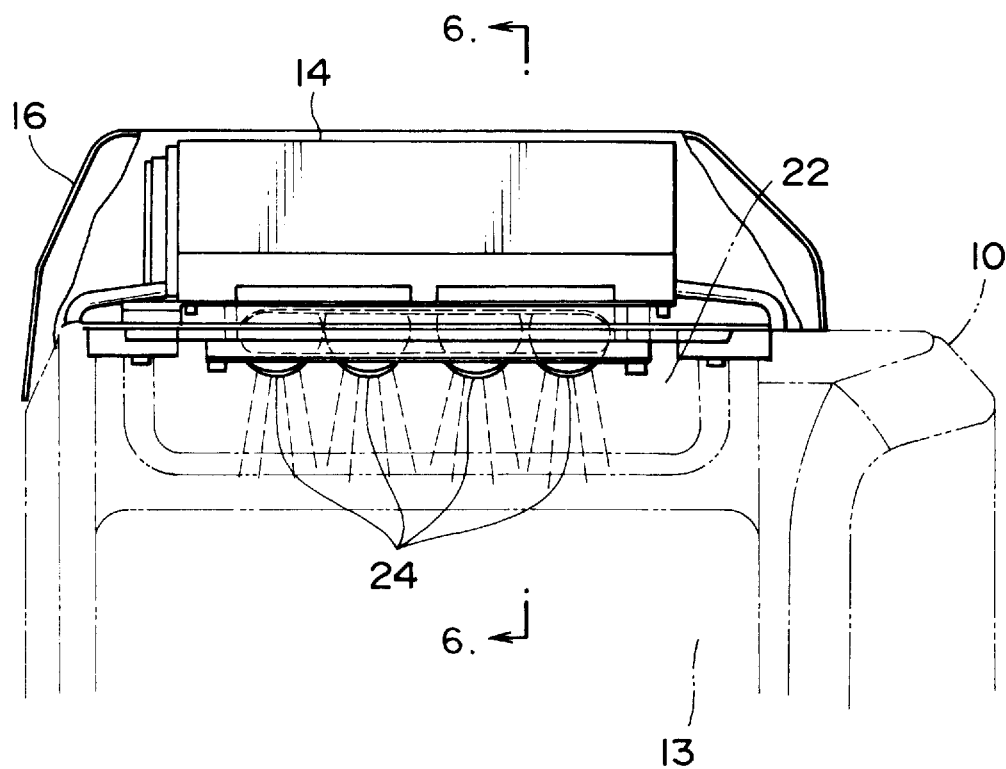
FIG. 5 is a front view showing a cooler unit as seen from B in FIG. 4.

FIG. 5 is a front view of the cooler unit 14 as seen from B in FIG. 4, with four air blow-off ports 24 being formed.

Figure 6:
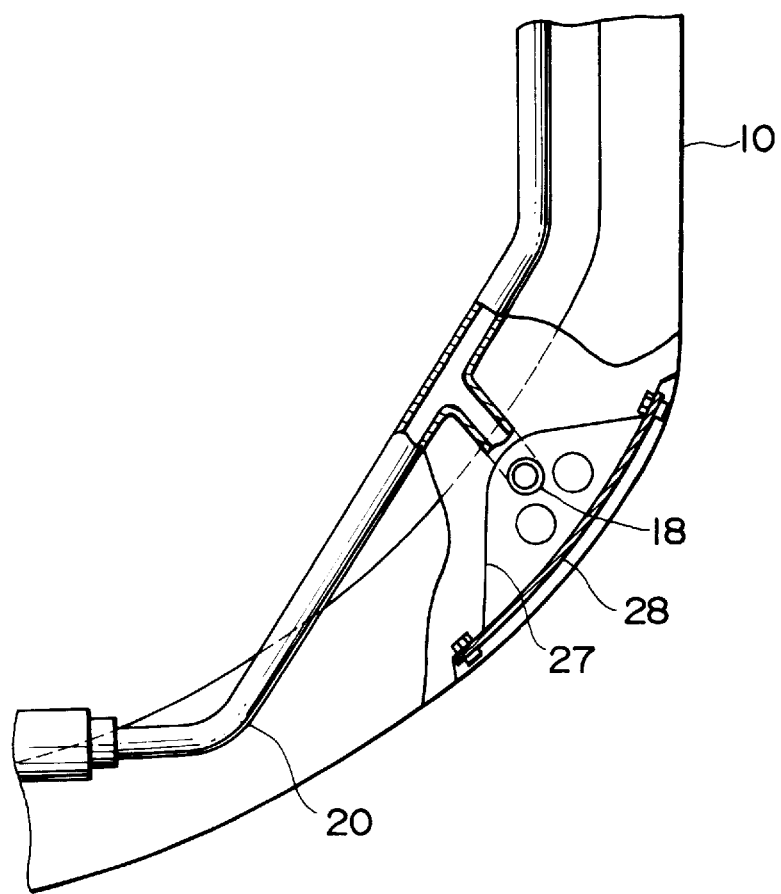
FIG. 6 is a sectional plan view of principal components of portion C in FIG. 2, showing another example of a rear drain pipe.

FIG. 6 is a sectional plan view of principal components of portion C in FIG. 2, showing another example of a rear drain pipe 18. In FIG. 6, the numeral 10 denotes a cabin. Numeral 18 denotes a rear drain pipe, and numeral 20 denotes a communication pipe. Numeral 27 denotes a recess formed vertically in the outer peripheral surface of the cabin 10. Numeral 28 denotes a cover for the recess 27.

An air conditioner according to an embodiment of the present invention will now be described with reference to FIGS. 1 to 6. In this embodiment, a cooler unit 14 and a condenser 15 for liquefying a gaseous refrigerant by forced cooling, in the air conditioner which is for conditioning the air present in the interior of a cabin 10, are disposed integrally on the upper surface of the ceiling 21 of the cabin 10. The cooler unit 14 and the condenser 15 are disposed on the rear side of the skylight 22 formed in the front portion of the ceiling 21 and so as to be received within the size of the cabin ceiling in plan view. In this embodiment, at the position of the ceiling 21 which faces conditioned air blow-off ports 24 of the cooler unit 14, there is formed a window hole 23 which communicates the conditioned air blow-off ports 24 with the interior of the cabin 10. The outer periphery of the cooler unit 14 and that of the condenser 15 are covered with the cover 16. The cover 16 is integrally secured to the cabin 10 with bolts. In a non-installed state of the air conditioner to the cabin 10, the cover 29 capable of closing the window hole 23 is mounted removably.

For the discharge of drain from the cooler unit 14, the drain pipes 17 and 18 are laid at two front and rear positions of the cabin 10. Part of the drain pipe 17 disposed on the front side serves as a pipy hand rail 12. The hand rail 12 is positioned near the entrance for getting on and off the cabin 10 (namely, near the door 11 shown in FIGS. 1 and 4) so that the operator of the machine can grasp it at the time of getting on and off the cabin. On the other hand, the drain pipe 18 disposed on the rear side extends vertically along the outer peripheral surface of the rear side of the cabin 10, as shown in FIG. 2.

Another example of the rear drain pipe 18 is shown in FIG. 6, in which a recess 27 is formed vertically in the outer peripheral surface of the rear side of the cabin 10, and the rear drain pipe 18 is laid in the recess 27, with the cover 28 being mounted to cover the recess 27.

The operation of the air conditioner mounted on the cabin 10 in this embodiment will now be described. In this embodiment, since the cabin 10 and the air conditioner provide an integral impression, the air conditioner can be mounted on the upper surface of the ceiling 21 of the cabin 10 without spoiling the nice appearance. Moreover, since the air conditioner does not occupy the interior space of the cabin 10, the narrow residential space in the interior of the cabin 10 can be fully utilized effectively. Since air is blown off to the operator from the side of the ceiling 21, the operator undergoes a head-cold foot-hot action and thus it is possible to effect an effective and healthy air conditioning. Besides, since the air conditioner can be mounted easily to the upper surface of the ceiling 21, it can be attached as a later option to a completed car simply and in a short time. While the cabin 10 is not equipped with the air conditioner, the cover plate 29 is attached to the window hole 23 of the ceiling 21 to close the window hole 23, so it is possible to keep low the overall height of he cabin 10 in a non-installed state of the air conditioner. Additionally, it is possible to reduce the manufacturing cost of the cabin.

Of the drain pipes of the cooler unit 14, the drain pipe 17 disposed on the front side of the cabin 10 is used as a hand rail 12 for getting on and off the cabin on the left front side of the cabin in plan view, as shown in FIG. 2. The drain pipe 18 disposed on the rear side is positioned near a corner portion on the right rear side of the cabin 10 in plan. Therefore, when the machine body tilts to the front or to the left during operation of the small-sized hydraulic excavator, drain is discharged through the front drain pipe 17. On the other hand, when the machine body tilts to backward or rightward, drain is discharged through the rear drain pipe 18. Since a part of the front drain pipe 17 is used as the hand rail 12, the piping cost is reduced. It is also possible to retain the nice appearance.

In the case where the rear drain pipe 18 is laid in the recess 27 and the recess is then covered with the cover 28, as shown in FIG. 6, it is possible to protect the drain pipe 18 from striking against an obstacle present outside. This structure also permits retaining of the nice appearance. The rear drain pipe 18 may also be inserted into a hand rail.

Figure 7:
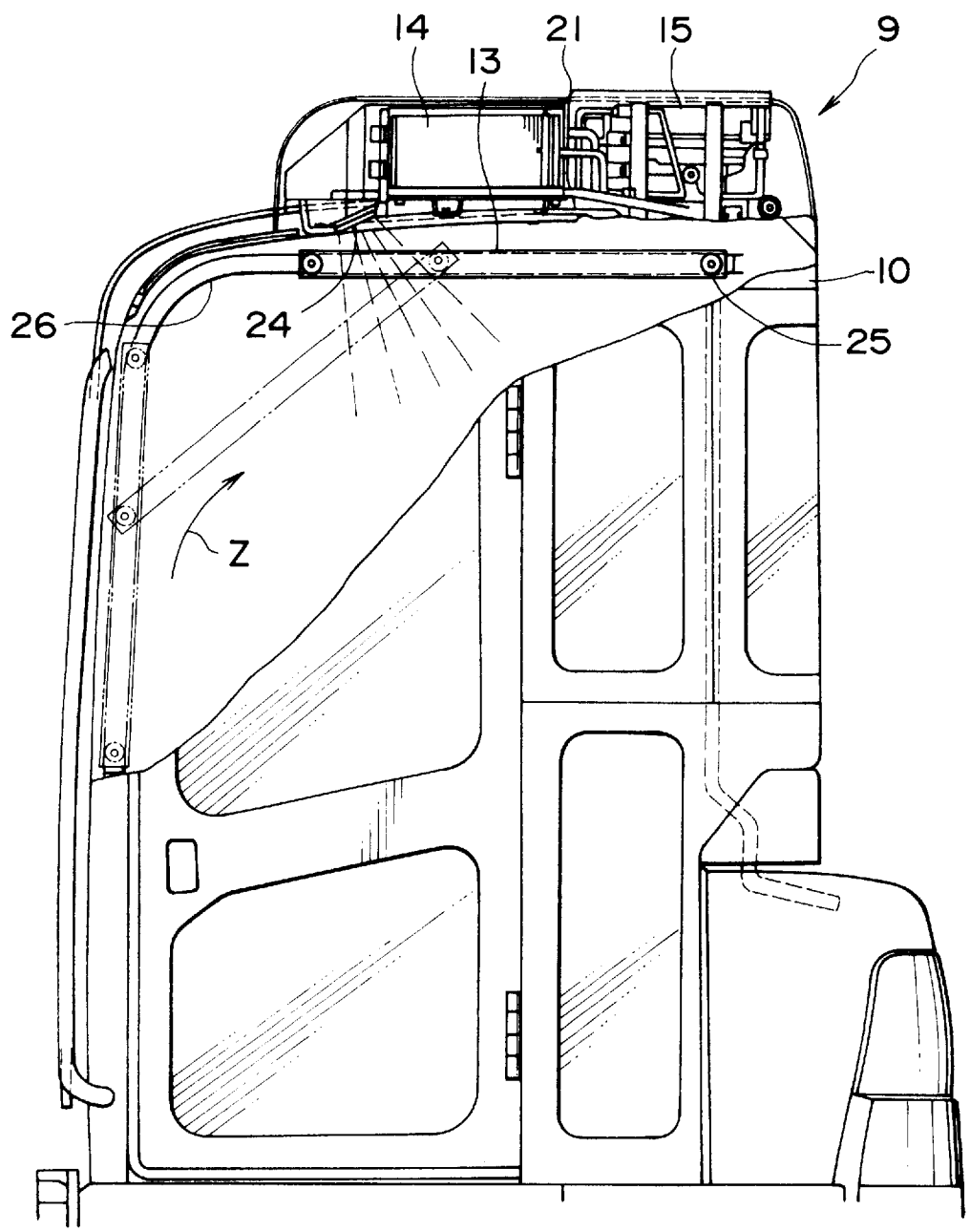
FIG. 7 is a partially cut-away side view of the upper carriage with a front window of a cabin in FIG. 4 sprung up pivotally.
Figure 8:
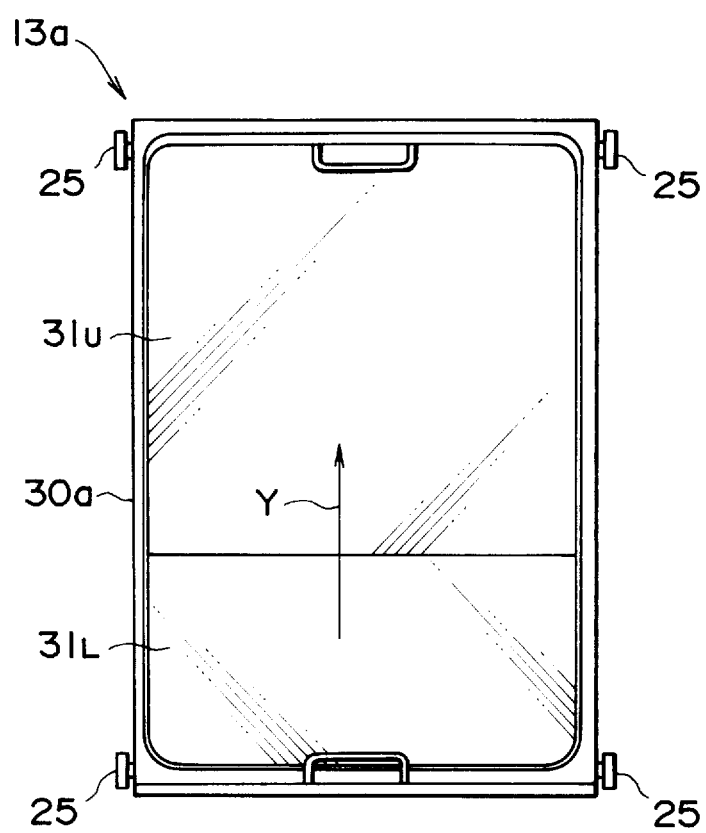
FIG. 8 is a front view showing another example of the front window in FIG. 7.

FIG. 7 is a partially cut-away side view of an upper rotating structure 9 in a pivotally sprung-up state of a front window 13 of the cabin 10 shown in FIG. 4 (the front window 13 moved in the direction of arrow Z toward the underside of the ceiling 21 manually or electrically though not shown). In FIG. 8, the front window 13 is disposed on the underside of the cooler unit 14.

FIG. 8 is a front view showing another example of the front window 13 in FIG. 7. In the same figure, the numeral 13a denotes a front window, numeral 30a denotes a frame of the front window 13a, and numerals 31U and 31L denote sash type glass plates inserted in the window frame 30a.

Figure 9:
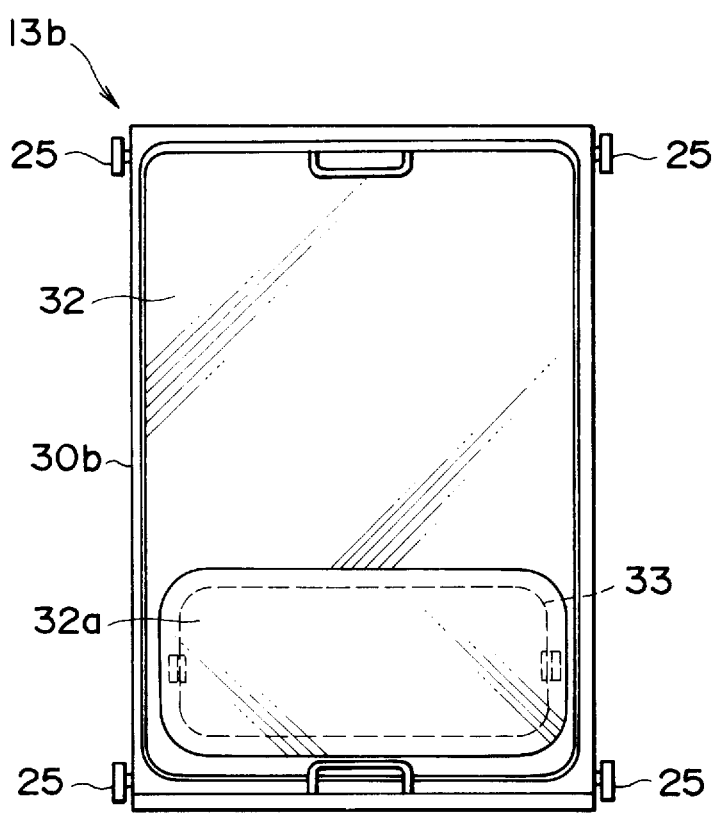
FIG. 9 is a front view showing a further example of the front window.

FIG. 9 is a front view showing a further example of the front window 13. In the same figure, the numeral 13b denotes a front window, 30b denotes a frame of the front window 13b, numeral 32 denotes a glass plate fitted in the window frame 30b, and numeral 32a denotes a glass plate attached removably to an opening 33 formed in the glass plate 32.

The following structure is now provided about the structure in which the front window 13 is pivotally sprung up and stowed to the underside of the ceiling 21 of the cabin 10. The cabin 10 is designed so that the front window 13 is stowed on the lower surface side of the ceiling 21 in an open condition of the front window. The front window 13 shown in FIG. 7 is removable, and by removing the front window it is made possible to ensure a passage of air blown off from the conditioned air blow-off ports 24 in the cooler unit 14.

The blown-off air passage shown in FIG. 8 will now be described. The glass plate of the front window 13a is composed of plural sash type glass plates 31L and 31U which can move inside the frame 30a of the front window 13a. The glass plate 31L can move in the direction of arrow Y. By opening the glass plate 31L it is possible to open the passage of air blown off from the conditioned air blow-off ports 24.

Description is now directed to a further example of a blown-off air passage shown in FIG. 9. As shown in the same figure, a glass plate 32a which constitutes part of the lower portion of the front window 13b is formed removably. The passage of air blown off from the conditioned air blow-off ports 24 can be opened by removing the glass plate 32b.

Reference will now be made to a still further example of a blown-off air passage (not shown). Other conditioned air blow-off ports communicating with the conditioned air blow-off ports 24 may be formed in a stationary portion other than the upper-side portion in a stowed state of the front window. Even when an unremovable front window (the front window 13 shown in FIG. 7 is of an unremovable structure) is stowed below the ceiling 21, the passage of air blown off from the cooler unit 14 can be opened toward the operator.

Figure 10:
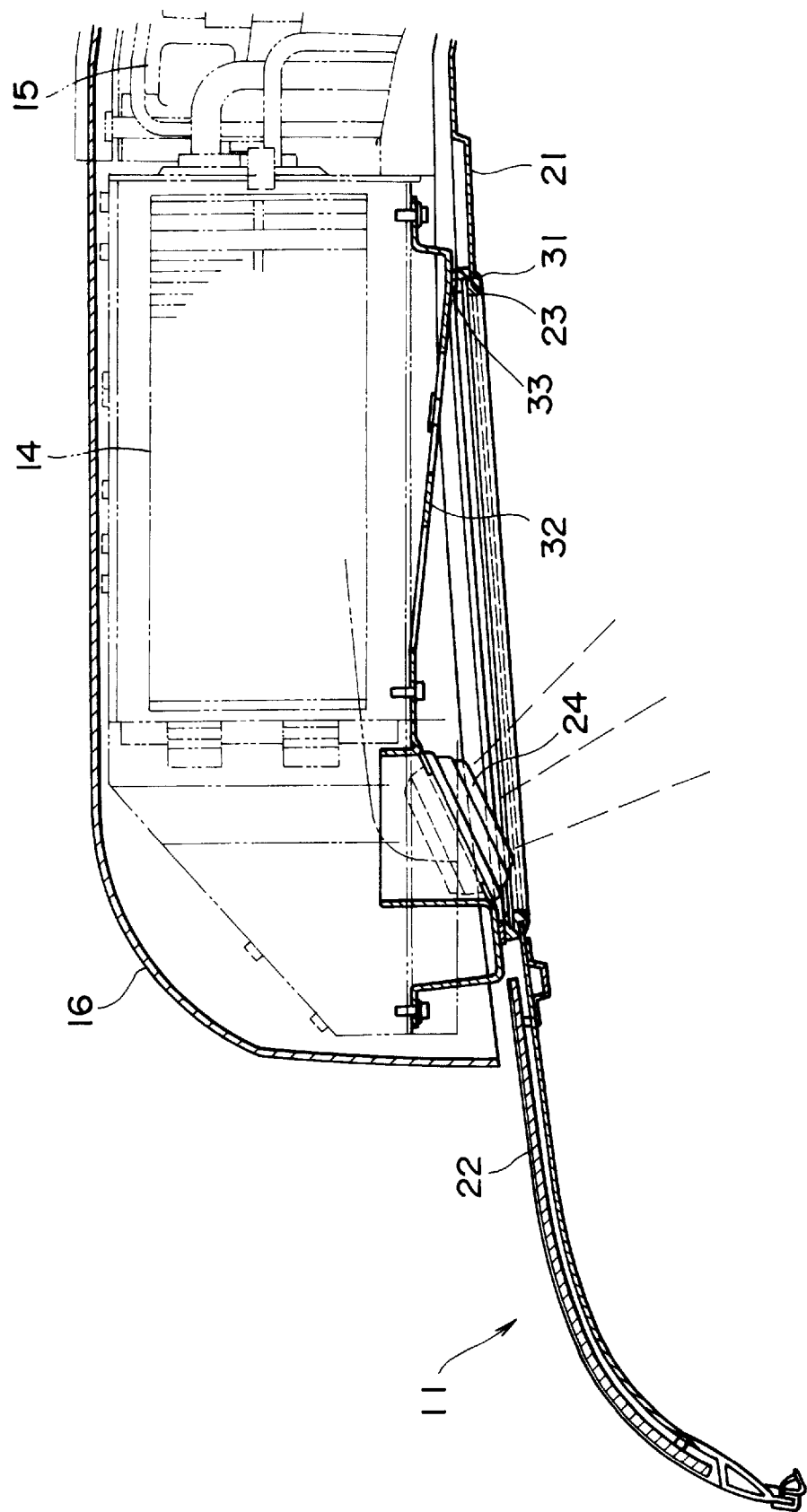
FIG. 10 is a sectional view taken on line E—E in FIG. 5.

FIG. 10 is a sectional view taken on line E—E in FIG. 5. In the same figure, numeral 31 denotes an endless sealing trim member fitted in the whole circumference of the peripheral edge portion of a window hole. Numeral 32 denotes a bottom cover plate of the cooler unit 14, numeral 33 denotes a frame-shaped sealing member fixed to the underside of the bottom cover plate 32, and numeral 22 denotes the skylight formed in the front portion of the ceiling 21.

Figure 11:
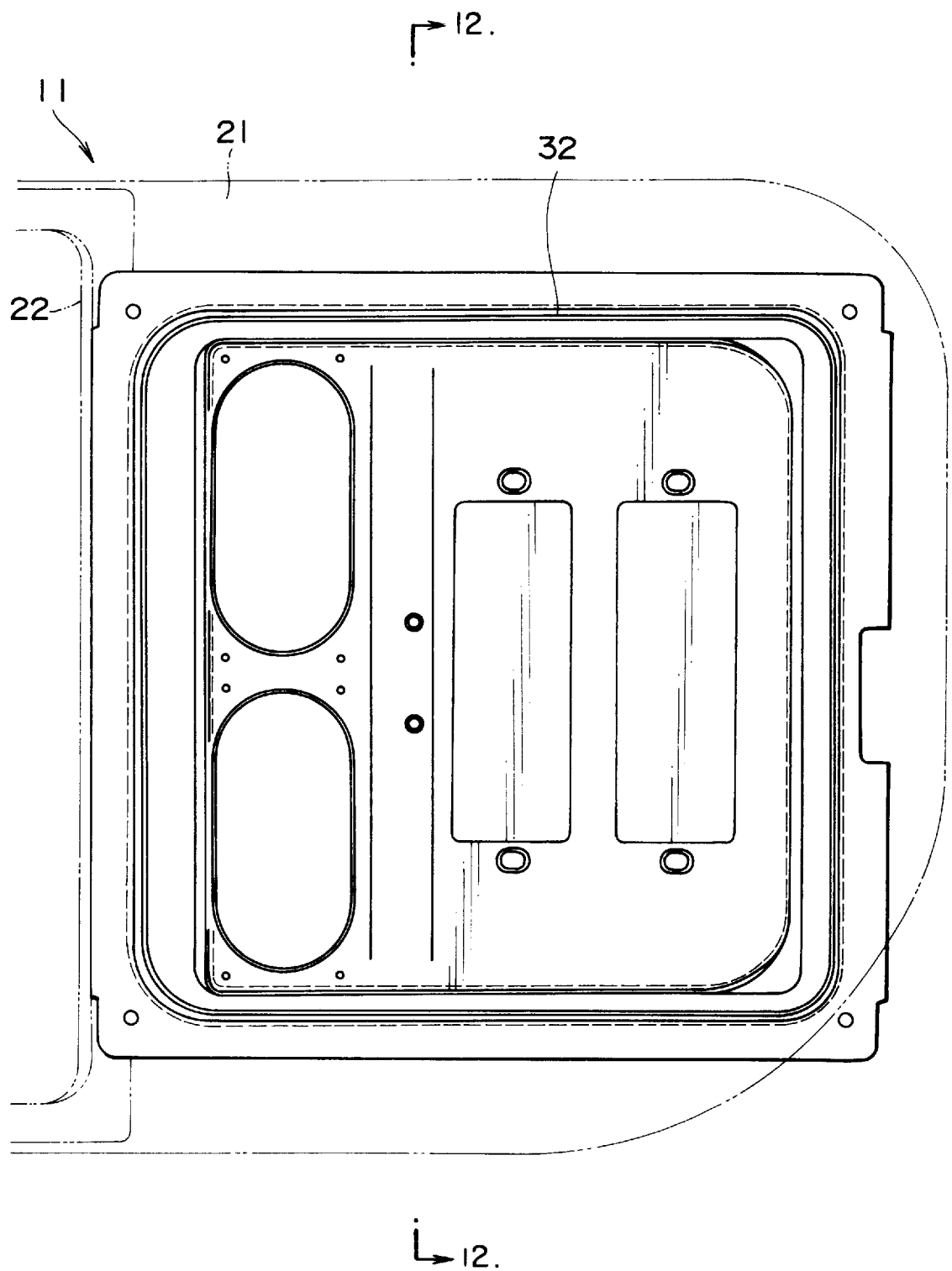
FIG. 11 is a plan view of a bottom cover plate 32 shown in FIG. 10.
Figure 12:
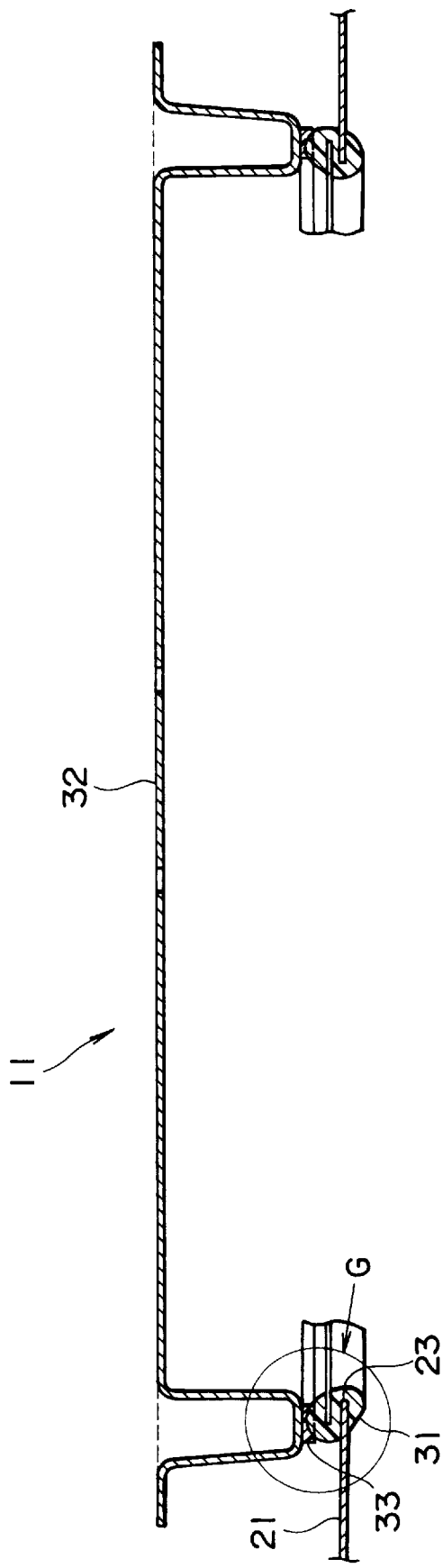
FIG. 12 is a sectional view taken on line F—F in FIG. 11.
Figure 13:
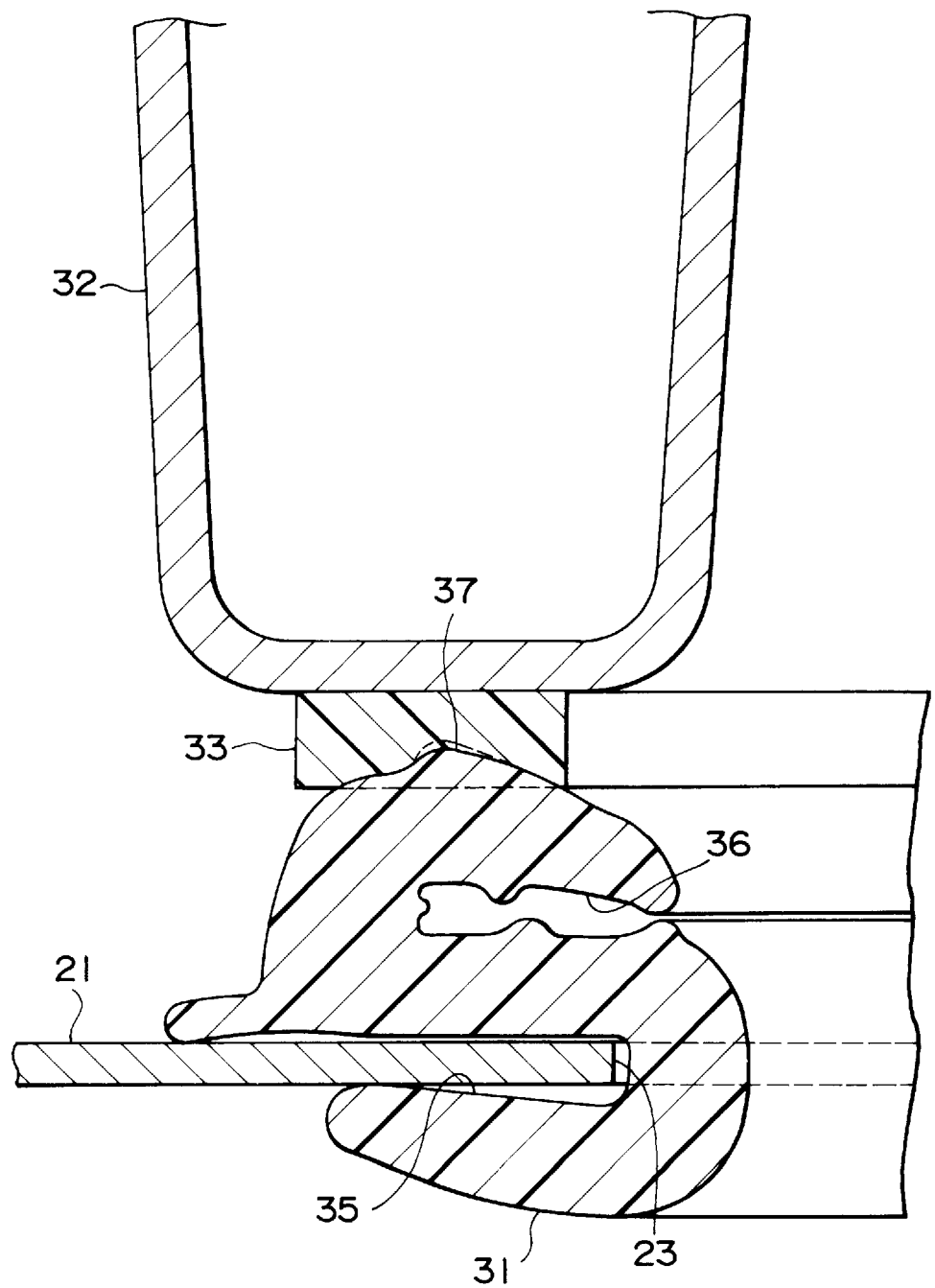
FIG. 13 is an enlarged view of portion G in FIG. 12.
Figure 14:
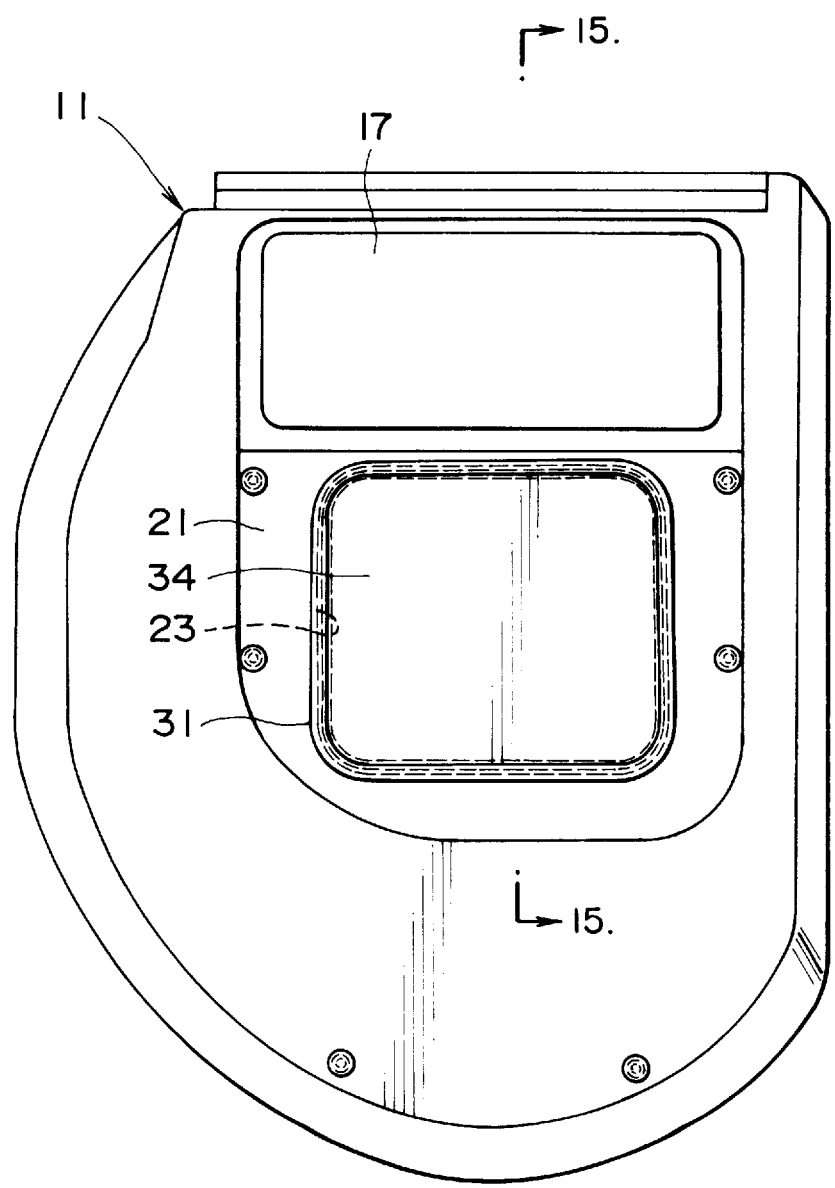
FIG. 14 is a plan view of principal components of a cabin 11 not equipped with an air conditioner.
Figure 15:
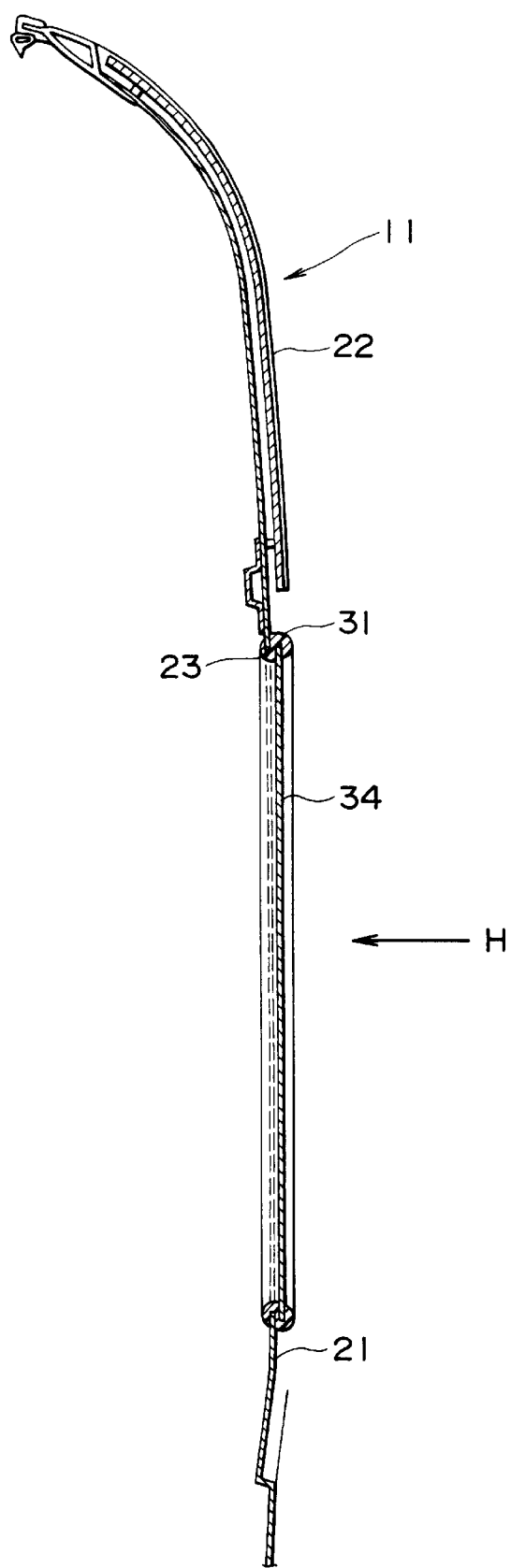
FIG. 15 is a sectional view taken on line G—G in FIG. 14.
Figure 18:
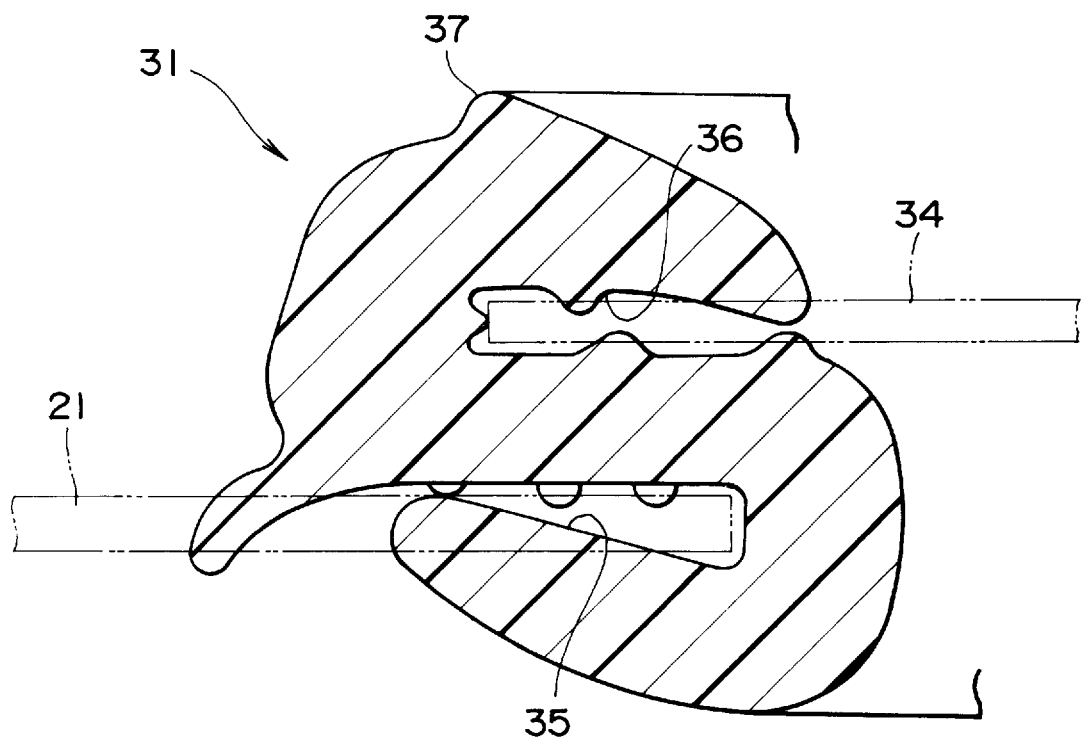
FIG. 18 is a sectional view taken on line I—I in FIG. 16.
Figure 19:
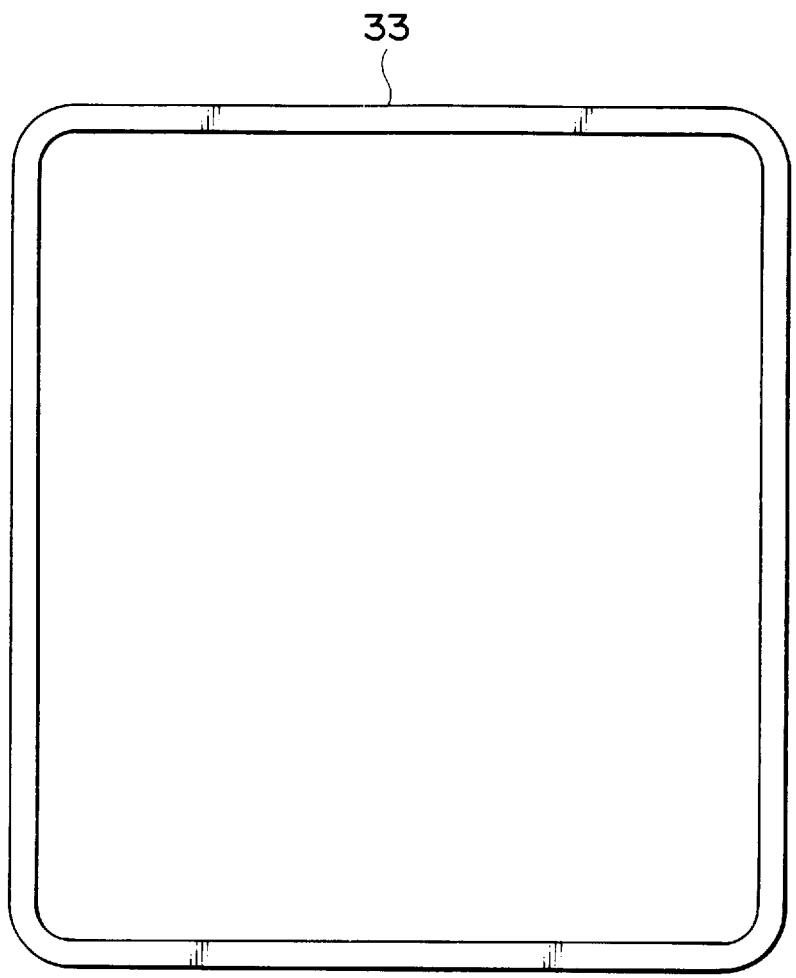
FIG. 19 is a plan view of a frame-shaped sealing member.

FIG. 11 is a plan view of the bottom cover plate 32 shown in FIG. 10, FIG. 12 is a sectional view taken on line F—F in FIG. 11, FIG. 13 is an enlarged view of portion G in FIG. 12, and FIG. 14 is a plan view of a principal portion of the cabin 11 with the air conditioner (including the cooler unit 14 and the condenser 15) not mounted. In FIG. 14, numeral 34 denotes a cover plate mounted for closing the window hole 23. FIG. 15 is a sectional view taken on line G—G in FIG. 14, FIG. 16 is a plan view of the trim member 31 as seen from H in FIG. 15, FIG. 17 is an enlarged view of portion J in FIG. 16, and FIG. 18 is a sectional view taken on line I—I in FIG. 16. In FIGS. 17 and 18, the numeral 35 denotes a groove formed in the trim member 31 for fitting in the window hole, numeral 36 denotes a groove for fitting and mounting therein of the cover plate 34, and numeral 37 denotes a projecting edge formed on the upper end of the outer periphery of the trim member 14 throughout the whole circumference. FIG. 19 is a plan view of the frame-shaped sealing member 33.

Next, the structure of a sealing device in a preferred embodiment of the invention will be described with reference to FIGS. 10 to 19. In this embodiment, a window hole 23 for communication of the conditioned air blow-off ports 24 in the cooler unit 14 with the interior of the cabin 11 is formed in the ceiling 21 of the cabin. The sealing trim member 31 is formed of a synthetic resin having elasticity (for example, rubber) and it has a groove 35, which is fitted in the window hole 23 throughout the whole circumference of the inner peripheral edge of the window hole. Further, on the inner peripheral side of the trim member 31, a groove 36 is formed in the upper portion thereof, and the bottom cover plate 32 of the cooler unit 14 is brought into watertight contact with the outer peripheral surface of the trim member 31. In an uninstalled state of the air conditioner comprising the cooler unit 14 and the condenser 15, the outer peripheral edge of the cover plate 34 which closes the window hole 23 is fitted in a watertight manner and throughout the whole circumference thereof in the groove 36 of the trim member 31. In this embodiment, moreover, on the outer periphery side of the trim member 31, a projecting edge 37 is formed throughout the whole circumference of the upper end portion. Further, a frame-shaped sealing member 33 formed of a synthetic resin (for example, urethane) having elasticity, which is in abutment with the upper surface of the trim member 31, is fixed to the underside of the bottom cover plate 32 of the cooler unit 14. For example, this fixing is effected by the use of an adhesive. Further, the projecting edge 37 is brought into pressure contact with the underside of the frame-shaped sealing member 33.

The operation of the sealing device constructed as above will now be described. When the cooler unit 14 is attached to the window hole 23 formed in the ceiling 21 of the cabin 11, the frame-shaped sealing member 33 fixed to the underside of the bottom cover plate 32 of the cooler unit 14 is brought into pressure contact with the projecting edge of the 37 of the trim member 31, whereby it is possible to prevent the entry of rain water from the window hole 23 into the cabin 11. On the other hand, with the air conditioner not mounted, the outer peripheral edge of the cover plate 34 which doses the window hole 23 is fitted in a watertight manner into the groove 36 of the trim member 31. Thus, with a single trim member 31, both cooler unit and cover plate 34 can be sealed positively.

We claim:

1. A construction machine comprising:
   a lower carriage;
   a cabin disposed on said lower carriage, said cabin having a ceiling;
   an air conditioning means mounted on said ceiling, said air conditioning means comprising a cooler unit for conditioning air present in an interior of said cabin and a condenser for liquefying a gaseous refrigerant by forced cooling;
   a conditioned air blow-off port equipped on said cooler unit;
   a window hole for opening said conditioned air blow-off port into said cabin, said window hole being formed in said ceiling at a position corresponding to the conditioned air blow-off port;
   a front window, said front window being stowed on the underside of said ceiling in an open condition of the front window; and
   means for preventing said front window from blocking said air blow-off port when said window is stowed.

2. A construction machine according to claim 1, wherein said front window is removable, and a passage of air blown off from said conditioned air blow-off port opened by removing the front window.

3. A construction machine according to claim 1, wherein said front window has a plurality of glass plates which are movable within a frame of the front window, and a passage of air blown off from said conditioned air blow-off port is opened by moving at least one of said glass plates.

4. A construction machine according to claim 1, wherein part of said front window is removable, and a passage of air blown off from said conditioned air blow-off port is opened by removing part of the front window.

5. A construction machine according to claim 1, wherein another conditioned air blow-off port communicating with said conditioned air blow-off port is formed in said ceiling at a position not opposed to said front window in the stowed state of the front window.

6. A construction machine comprising:
   a lower carriage;
   a cabin disposed on said lower carriage, said cabin having a ceiling;
   an air conditioning means mounted on said ceiling, said air conditioning means comprising a cooler unit for conditioning air present in an interior of said cabin and a condenser for liquefying a gaseous refrigerant by forced cooling;
   a conditioned air blow-off port equipped on said cooler unit;
   a window hole for opening said conditioned air blow-off port into said cabin, said window hole being formed in said ceiling at a position corresponding to the conditioned air blow-off port;
   a front window, said front window being stowed on the underside of said ceiling in an open condition of the front window;
   a skylight formed in a front portion of said ceiling;
   wherein said cooler unit and said condenser are disposed on a rear side of said skylight and substantially received within said ceiling of said cabin in plan.

7. A construction machine according to claim 2, wherein said air conditioning means is removable, and a cover plate is mounted removably, said cover plate capable of dosing said window hole in a removed state of the air conditioning means.

8. A construction machine according to claim 2, further comprising a cover for covering the outer periphery of said cooler unit and that of said condenser.

9. A construction machine according to claim 2, further comprising a drain pipe for the discharge of drain from said cooler unit.

10. A construction machine according to claim 9, wherein said drain pipe is disposed on each of a front side and a rear side of said cabin.

11. A construction machine according to claim 10, wherein the drain pipe disposed on the rear side of the side cabin extends vertically along an outer peripheral surface of the rear side of the cabin.

12. A construction machine according to claim 2, wherein a window hole is formed in the outer peripheral surface of the cabin ceiling, and said air conditioning means is mounted to said window hole removably.

13. A construction machine according to claim 12, wherein a sealing trim member is fitted in said window hole throughout a whole circumference of an inner peripheral edge of the window hole.

14. A construction machine according to claim 13, wherein a bottom cover plate of said air conditioning means is in watertight abutment with an outer peripheral surface of said trim member.

15. A construction machine according to claim 13, wherein, when said air conditioning means is mounted, a bottom cover plate of the air conditioning means is brought into watertight contact with an outer peripheral surface of said trim member, while when the air conditioning means is not mounted, a cover plate for closing said window hole is brought into watertight contact with the outer peripheral surface of the trim member.

16. A construction machine comprising:

a lower carriage;

a cabin disposed on said lower carriage, said cabin having a ceiling;

an air conditioning means mounted on said ceiling, said air conditioning means comprising a cooler unit for conditioning air present in an interior of said cabin and a condenser for liquefying a gaseous refrigerant by forced cooling; and a drain pipe for the discharge of drain from said cooler unit, said drain pipe being disposed on the front side of said cabin so as to be constituted as a pipe-shaped hand rail to be grasped by an operator at the time of getting on and off the cabin.

17. A construction machine according to claim 16, wherein the drain pipe disposed on the front side of said cabin is inserted into the hand rail.

18. A construction machine comprising:

a lower carriage;

a cabin disposed on said lower carriage, said cabin having a ceiling;

an air conditioning means mounted on said ceiling, said air conditioning means comprising a cooler unit for conditioning air present in an interior of said cabin and a condenser for liquefying a gaseous refrigerant by forced cooling;

a recess formed vertically in the outer peripheral surface of the rear side of said cabin; and a drain pipe for the discharge of drain from said cooler unit, said drain pipe being disposed on the rear side of said cabin so as to extend vertically in said recess.

19. A construction machine according to claim 18, further comprising a cover for covering said recess.

20. A construction machine comprising:

a lower carriage;

a cabin disposed on said lower carriage, said cabin having a ceiling;

an air conditioning means mounted on said ceiling, said air conditioning means comprising a cooler unit for conditioning air present in an interior of said cabin and a condenser for liquefying a gaseous refrigerant by forced cooling;

a window hole formed in the outer peripheral surface of the cabin ceiling, and said air conditioning means is mounted to said window hole removably a sealing trim member fitted in said window hole throughout a whole circumference of an inner peripheral edge of said window hole a bottom cover plate of said air conditioning means in watertight abutment with an outer peripheral surface of said trim member; and a groove formed in an upper portion on an inner periphery side of said trim member, and said bottom cover plate is fitted in said groove removably.

21. A construction machine comprising:

a lower carriage;

a cabin disposed on said lower carriage, said cabin having a ceiling;

an air conditioning means mounted on said ceiling, said air conditioning means comprising a cooler unit for conditioning air present in an interior of said cabin and a condenser for liquefying a gaseous refrigerant by forced cooling;

a window hole formed in the outer peripheral surface of the cabin ceiling, and said air conditioning means is mounted to said window hole removably a sealing trim member fitted in said window hole throughout a whole circumference of an inner peripheral edge of said window hole a bottom cover plate of said air conditioning means in watertight abutment with an outer peripheral surface of said trim member; and a projecting edge formed on an upper end of an outer periphery side of said trim member throughout the whole circumference, said projecting edge being brought into pressure contact with said bottom cover plate.

22. A construction machine according to claim 21, wherein a frame-shaped sealing member formed of a synthetic resin having elasticity is fixed to an underside of said bottom cover plate, said frame-shaped sealing member coming into abutment with a whole circumference of an upper surface of said trim member.

* * * * *